United States Patent
Sun et al.

(10) Patent No.: US 12,133,281 B2
(45) Date of Patent: Oct. 29, 2024

(54) COMMUNICATION METHOD AND WIRELESS COMMUNICATIONS APPARATUS

(71) Applicant: Huawei Technologies Co., Ltd., Shenzhen (CN)

(72) Inventors: Bing Sun, Beijing (CN); Junren Chang, Beijing (CN); Jun Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 842 days.

(21) Appl. No.: 16/989,189

(22) Filed: Aug. 10, 2020

(65) Prior Publication Data

US 2020/0374973 A1 Nov. 26, 2020

Related U.S. Application Data

(63) Continuation of application No. PCT/CN2019/073014, filed on Jan. 24, 2019.

(30) Foreign Application Priority Data

Feb. 11, 2018 (CN) .......................... 201810143194.9

(51) Int. Cl.
*H04W 76/34* (2018.01)
*H04L 5/00* (2006.01)
(Continued)

(52) U.S. Cl.
CPC ........... *H04W 76/34* (2018.02); *H04L 5/0032* (2013.01); *H04W 60/005* (2013.01); *H04W 68/02* (2013.01); *H04W 76/15* (2018.02)

(58) Field of Classification Search
CPC ............. H04W 56/0045; H04W 64/00; H04W 74/0833; H04W 72/23; H04W 4/02;
(Continued)

(56) References Cited

U.S. PATENT DOCUMENTS 9,451,442 B2  9/2016 Zhang et al.
9,491,732 B2  11/2016 Wang et al.
(Continued)

FOREIGN PATENT DOCUMENTS

CN  101287236 A  10/2008
CN  101801055 A  8/2010
(Continued)

OTHER PUBLICATIONS

China Unicom (Rapporteur) et al, "TP on LTE impacts for HSPA and LTE Joint Operation", 3GPP TSG-RAN WG2 #96, R2-168992, Nov. 14-18, 2016, 27 pages, Reno, Nevada, USA.
(Continued)

*Primary Examiner* — Kwasi Karikari
(74) *Attorney, Agent, or Firm* — Slater Matsil, LLP

(57) ABSTRACT

A communication method and a wireless communications apparatus are provided. The method includes sending, by the wireless communications apparatus, a first request message to a first cell, where the first request message is used to request to release a wireless connection between a first user and the first cell, receiving, by the wireless communications apparatus, a response message from the first cell, where the response message is used to respond to the first request message, and sending, by the wireless communications apparatus, a second request message to a second cell, where the second request message is used to request to establish a wireless connection between a second user and the second cell.

20 Claims, 4 Drawing Sheets

(51) Int. Cl.
　　*H04W 60/00*　　(2009.01)
　　*H04W 68/02*　　(2009.01)
　　*H04W 76/15*　　(2018.01)
(58) Field of Classification Search
　　CPC ......... H04W 36/0083; H04W 72/0446; H04W
　　　　　　24/02; H04W 56/001; H04W 72/02;
　　　　　　H04W 48/12; H04W 56/0005; H04W
　　　　　　56/004; H04W 74/04; H04W 92/10;
　　　　　　H04W 72/044; H04W 72/1268; H04W
　　　　　　72/1273; H04W 4/48; H04W 40/20;
　　　　　　H04W 56/005; H04W 74/0866; H04W
　　　　　　8/08; H04W 28/20; H04W 28/26; H04W
　　　　　　36/36; H04W 40/04; H04W 48/04
　　See application file for complete search history.

(56) References Cited

U.S. PATENT DOCUMENTS

| | | | |
|---|---|---|---|
| 10,244,501 | B2 | 3/2019 | Miao et al. |
| 2010/0316034 | A1 | 12/2010 | Burbidge et al. |
| 2014/0080485 | A1 | 3/2014 | Park |
| 2014/0220981 | A1 | 8/2014 | Jheng et al. |
| 2015/0056998 | A1* | 2/2015 | Kaikkonen ........... H04W 76/19 455/436 |
| 2015/0373661 | A1 | 12/2015 | Fulzele et al. |
| 2016/0353334 | A1 | 12/2016 | Kim et al. |
| 2017/0070877 | A1* | 3/2017 | Shi ........................ H04W 8/183 |
| 2017/0359762 | A1* | 12/2017 | Yoo ....................... H04W 76/10 |
| 2019/0069193 | A1* | 2/2019 | Astrom ............... H04W 52/028 |

FOREIGN PATENT DOCUMENTS

| | | |
|---|---|---|
| CN | 102045876 A | 5/2011 |
| CN | 102308629 A | 1/2012 |
| CN | 102348257 A | 2/2012 |
| CN | 102986261 A | 3/2013 |
| CN | 103517454 A | 1/2014 |
| CN | 103609151 A | 2/2014 |
| CN | 105338178 A | 2/2016 |
| CN | 106465464 A | 2/2017 |
| CN | 106922004 A | 7/2017 |
| WO | 2015009510 A2 | 1/2015 |

OTHER PUBLICATIONS

Intel Corporation, Dual registration solution for 5GS / EPS interworking, 3GPP TSG-RAN WG2 Meeting #100, R2-1712688 (revision of R2-1710637), Nov. 27-Dec. 1, 2017, 3 pages, Reno, Nevada, USA.
ZTE, "Extended Long DRX Mode for UE Power Saving", SA WG2 Meeting #94, S2-124406, Nov. 12-16, 2012, 4 pages, New Orleans, USA.
Huawei, HiSilicon, "Discussion on dual registration and issues in LTE", 3GPP TSG-RAN WG2 Meeting #101, R2-1802869, Feb. 26-Mar. 2, 2018, R2-1802869, 4 pages, Athens, Greece.
Huawei, HiSilicon, "CTC, Discussion on dual registration and issues in LTE", 3GPP TSG-RAN WG2 Meeting #103, R2-1812618, Aug. 20-24, 2018, 4 pages, Gothenburg, Sweden.
Huawei, HiSilicon, "China Telecom Corporation Ltd., Discussion on dual registration and issues in LTE", 3GPP TSG-RAN WG2 Meeting #102 , R2-1808410, May 21-25, 2018, 5 pages, Busan, Korea.
Huawei, HiSilicon, "Discussion on dual registration and issues in LTE", 3GPP TSG-RAN WG2 Meeting #101b , R2-1805497, Apr. 16-20, 2018, 4 pages, Sanya, China.
Samsung, "RAN2 aspects to support dual registration", 3GPP TSG-RAN WG2 NR Ad hoc 1801, R2-1801451, Jan. 22-Jan. 26, 2018, 3 pages, Vancouver, Canada.
VIVO, "Analysis on the feasibility and technical restrictions of dual registration", 3GPP TSG-RAN WG2 NR Ad hoc 0118, R2-1800859, Jan. 22-Jan. 26, 2018, 7 pages, Vancouver, Canada.
"3rd Generation Partnership Project; Technical Specification Group Core Network and Terminals; Non-Access-Stratum (NAS) protocol for Evolved Packet System (EPS); Stage 3 (Release 14)," 3GPP TS 24.301 V14.1.0, Sep. 2016, 460 pages.
"3rd Generation Partnership Project; Technical Specification Group Radio Access Network; Evolved Universal Terrestrial Radio Access (E-UTRA); User Equipment (UE) procedures in idle mode (Release 14)," 3GPP TS 36.304 V14.5.0, Dec. 2017, 49 pages.
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.4.0, Sep. 2017, 753 pages.
"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.0.0, Dec. 2017, 776 pages.
"3rd Generation Partnership Project; Technical Specification Group Radio Access Network NR Radio Resource Control (RRC) protocol specification (Release 15)," 3GPP TS 38.331 V15.0.0, Dec. 2017, 188 pages.
3GPP, Study on HSPA and LTE Joint Operation(Release 14), 3GPP TR 37.805 V14.0.0 (Jan. 2017), 3rd Generation Partnership Project, Technical Specification Group Radio Access Network, 27 pages.
Huawei, HiSilicon, "TP on dual standby in UMTS and LTE joint operation", R2-165102, 3GPP TSG-RAN WG2 #95, Aug. 22-26, 2016, 8 pages, Goeteborg, Sweden.
Qualcomm Incorporated, Solution description for concurrent UMTS CS and LTE PS, R3-161804, 3GPP TSG-RAN WG3 Meeting #93, Aug. 22-26, 2016, 15 pages, Gothenburg, Sweden.
Intel, Graceful tune-away from 5GS for DR-mode of operation, S2-178362, SA WG2 Meeting #S2-124, Nov. 27-Dec. 1, 2017, Reno, Nevada, USA, 2 pages.
Intel, Graceful tune-away from EPS for DR-mode of operation, S2-178363, 3GPP TSG-SA WG2 Meeting #124, Nov. 27-Dec. 1, 2017, 3 pages, Reno, NV, USA.
SA2, "LS on simultaneous transmission and/or reception over EPC/E-UTRAN and 5GC/NR", SA WG2 Meeting #122bis, S2-176689, Aug. 21-25, 2017, Sophia Antipolis, France, total 2 pages.
Motorola Mobility et al., "Service fallback in DR-mode of operation", SA WG2 Meeting #124, S2-178893, Nov. 27-Dec. 1, 2017, Reno, Nevada, total 3 pages.
HTC, "Update to dual registration procedure", SA WG2 Meeting #124, S2-178898, Nov. 27-Dec. 1, 2017, 4 pages, Reno, Nevada, US.

* cited by examiner

COMMUNICATION METHOD AND WIRELESS COMMUNICATIONS APPARATUS

CROSS-REFERENCE TO RELATED APPLICATIONS

This application is a continuation of International Application No. PCT/CN2019/073014, filed on Jan. 24, 2019, which claims priority to Chinese Patent Application No. 20181043194.9, filed on Feb. 11, 2018. The disclosures of the aforementioned applications are hereby incorporated by reference in their entireties.

TECHNICAL FIELD

This application relates to the field of communications technologies, and in particular, to a communication method and a wireless communications apparatus.

BACKGROUND

With development of communications technologies, terminals with a dual registration function have been widely used. Currently, among the terminals with the dual registration function, a type of terminal has a dual-receive single-transmit capability. The terminal may register with two networks at the same time, but can perform a data transmission service with only one network at a time. In other words, the terminal cannot perform the data transmission service with the two networks at the same time.

After the terminal having the dual-receive single-transmit capability registers with the two networks at the same time, if the terminal is in a connected state in a first network and is performing data transmission in the first network, when a second network pages the terminal, there is no corresponding specification in an existing standard on how the terminal simultaneously responds to a paging message of the second network and performs the data transmission with the first network. Therefore, in the prior art, the terminal that has the dual-receive single-transmit capability and that registers with the two networks at the same time cannot perform data transmission in the two networks at the same time. This may cause a failure to transmit data sent by a network side and cause a problem of resource waste.

SUMMARY

Embodiments of this application provide a communication method and a wireless communications apparatus, to resolve a problem of a failure to transmit data between a wireless communications apparatus and a network side and a problem of resource waste.

According to a first aspect, an embodiment of this application provides a wireless communications apparatus. The wireless communications apparatus includes: a first communications module, configured to: enable a first user to attach to a first network, and maintain a wireless connection to a first cell in the first network, a second communications module, configured to: enable a second user to attach to a second network, and camp on a second cell in the second network, a sending module, configured to send a first request message to the first cell, where the first request message is used to request to release the wireless connection between the first user and the first cell, and a receiving module, configured to receive a response message from the first cell, where the response message is used to respond to the first request message, where the sending module is further configured to send a second request message to the second cell, where the second request message is used to request to establish a wireless connection between the second user and the second cell.

According to the foregoing apparatus, when the wireless communications apparatus maintains the wireless connection between the first user and the first cell in the first network, and enables the second user to camp on the second cell in the second network, before the wireless connection between the second user and the second cell is established, the wireless connection between the first user and the first cell is released by using the first request message. In this way, the first cell determines a state of the wireless connection to the first user, and the first cell may no longer send downlink data, thereby avoiding a failure to transmit the downlink data and improving resource utilization.

According to the foregoing apparatus, when the wireless communications apparatus maintains the wireless connection between the first user and the first cell in the first network, and enables the second user to camp on the second cell in the second network, before the wireless connection between the second user and the second cell is established, the wireless connection between the first user and the first cell is released by using the first request message. In this way, the first cell determines a state of the wireless connection to the first user, and the first cell may no longer send downlink data, thereby avoiding a failure to transmit the downlink data and improving resource utilization.

In an optional implementation, the first user is in a connected state in the first cell, the response message includes first state indication information, and the first state indication information indicates an inactive state, a light connection state, or an idle state to which the first user is to switch, and the first communications module is further configured to enable the first user to switch to the state indicated by the first state indication information in the first network.

Because the response message includes the first state indication information, the wireless communications apparatus may directly determine the state of the first user in the first cell based on the first state indication information, thereby reducing a state switching delay and improving system efficiency.

In an optional implementation, the first user is in a connected state in the first cell, and the first request message includes second state indication information, and the second state indication information indicates an inactive state, a light connection state, or an idle state that the first user is to enter.

The wireless communications apparatus indicates, by using the second state indication information, the state that the first user needs to maintain in the first cell, so that a network side can relatively quickly determine the state of the wireless communications apparatus in the first cell, thereby improving system efficiency.

In an optional implementation, the first user is in a connected state in the first cell, and after the receiving module receives the response message from the first cell, the first communications module is further configured to enable the first user to switch to a preset state in the first network, where the preset state is an inactive state, a light connection state, or an idle state.

In the foregoing solution, signaling exchanged between the wireless communications apparatus and the first cell occupies a few resources, and after receiving the response message from the first cell, the wireless communications apparatus may release the wireless connection between the first user and the first cell, to quickly establish the wireless connection to the second cell, thereby reducing a delay of establishing a service in the second cell.

In an optional implementation, the first request message includes a state switching request cause, and the state switching request cause is that the second user performs any one of the following services in the second network: an emergency call, high priority access, mobile terminate-access, mobile originating signaling, mobile originating data, delay tolerant access, and a mobile originating voice call, or the state switching request cause is that an uplink radio frequency of the wireless communications apparatus is occupied.

In an optional implementation, the wireless communications apparatus further includes a timing module, and after the sending module sends the first request message to the first cell, the wireless communications apparatus: starts the timing module, where timing duration of the timing module is minimum interval duration for the sending module to send the first request message.

A frequency of sending the first request message can be effectively controlled by starting the timing module, thereby avoiding a signaling storm and improving system resource utilization.

In an optional implementation, the wireless communications apparatus further includes a counting module, and the counting module is configured to: count a quantity of first request messages sent by the sending module, and the sending module stops sending the first request message when a value counted by the counting module is greater than N, where N is a maximum value of a quantity of times that the sending module sends the first request message, and N is an integer greater than 0.

In an optional implementation, the first request message is user equipment (UE) assistance information signaling, the first request message includes radio resource control (RRC) connection release request indication information, and the RRC connection release request indication information is used to request to release the wireless connection between the first user and the first cell.

In an optional implementation, the first request message is a connection change request message, the connection change request message includes a radio resource control (RRC) connection preference (ConnectionPreference) information element or an RRC connection assistance (ConnectionAssistance) information element, and the RRC connection preference information element or the RRC connection assistance information element is used to request to change the wireless connection to the first cell.

In an optional implementation, the first request message is a connection release request message, the connection release request message includes an RRC connection preference (ConnectionPreference) information element or an RRC connection assistance (ConnectionAssistance) information element, and the RRC connection preference information element or the RRC connection assistance information element is used to request to change the wireless connection to the first cell.

In an optional implementation, the first request message is a state change request message, the state change request message includes an RRC connection preference (ConnectionPreference) information element or an RRC connection assistance (ConnectionAssistance) information element, and the RRC connection preference information element or the RRC connection assistance information element is used to request to change the wireless connection to the first cell.

In an optional implementation, the response message includes an uplink transmission resource configured for the wireless communications apparatus, and the uplink transmission resource is used to perform uplink data transmission when the first user restores transmission with the first network from the inactive state or the light connection state.

In an optional implementation, the following is further included: after enabling the first user to enter the inactive state, the light connection state, or the idle state, the first communications module continues to maintain a timing advance timer, and stores an uplink timing value of the timing advance timer.

In an optional implementation, the following is further included: when the first communications module enables the first user to determine, before restoring the wireless connection to the first network, that the timing advance timer does not expire, the wireless communications apparatus performs uplink data transmission based on the uplink timing value stored for the first user, or performs uplink data transmission based on a current uplink timing value and a configured uplink transmission resource.

In an optional implementation, the receiving module is further configured to: listen to dedicated signaling sent by the first network, where the dedicated signaling is used to indicate a service establishment request, a paging request, or a new data radio bearer establishment request of the first user in the first network.

In an optional implementation, the dedicated signaling is physical downlink control channel (PDCCH) dedicated signaling.

In an optional implementation, before the sending module sends the first request message to the first cell, the receiving module is further configured to: receive a paging message sent by the second network, where the paging message includes service type indication information or service quality of service (QoS) information, a service indicated by the service type indication information is at least one of a voice service, a data service, a low-latency service, a high-reliability service, or a low-latency and high-reliability service, and the service QoS information includes at least one of service quality of service class identifier (QCI) indication information, service latency requirement indication information, and service reliability requirement indication information.

According to a second aspect, an embodiment of this application provides a wireless communications apparatus, applied to a terminal. The wireless communications apparatus includes: a processor, configured to: enable the terminal to attach to a first network as an identity of a first user, and maintain a wireless connection to a first cell in the first network, and enable the terminal to attach to a second network as an identity of a second user, and camp on a second cell in the second network, and a transceiver, configured to send a first request message to the first cell, where the first request message is used to request to release the wireless connection between the first user and the first cell, where the transceiver is configured to receive a response message from the first cell, where the response message is used to respond to the first request message, and the transceiver is further configured to send a second request message to the second cell, where the second request message is used to request to establish a wireless connection between the second user and the second cell.

According to the foregoing apparatus, when the wireless communications apparatus maintains the wireless connection to the first cell in the first network as the identity of the first user, and camps on the second cell in the second network as the identity of the second user, before the wireless connection to the second cell is established as the identity of the second user, the first request message is used to release the wireless connection to the first cell as the identity of the first user. In this way, the first cell determines a state of the wireless connection to the first user, and the first cell may no longer send downlink data, thereby avoiding a failure to transmit the downlink data and improving resource utilization.

In an optional implementation, the wireless communications apparatus is in a connected state in the first cell as the identity of the first user, the response message includes first state indication information, and the first state indication information indicates an inactive state, a light connection state, or an idle state to which the first user is to switch, and the processor is further configured to enable the first user to switch to the state indicated by the first state indication information in the first network.

Because the response message includes the first state indication information, the wireless communications apparatus may directly determine the state of the first user in the first cell based on the first state indication information, thereby reducing a state switching delay and improving system efficiency.

In an optional implementation, the wireless communications apparatus is in a connected state in the first cell as the identity of the first user, and the first request message includes second state indication information, and the second state indication information indicates an inactive state, a light connection state, or an idle state that the first user is to enter.

The wireless communications apparatus indicates, by using the second state indication information, the state that the first user needs to maintain in the first cell, so that a network side can relatively quickly determine the state that is in the first cell for the wireless communications apparatus, thereby improving system efficiency.

In an optional implementation, the wireless communications apparatus is in a connected state in the first cell as the identity of the first user, and after the transceiver receives the response message from the first cell, the first communications module is further configured to enable the first user to switch to a preset state in the first network, where the preset state is an inactive state, a light connection state, or an idle state.

In an optional implementation, the first request message includes a state switching request cause, and the state switching request cause is that the second user performs any one of the following services in the second network: an emergency call, high priority access, mobile terminate-access, mobile originating signaling, mobile originating data, delay tolerant access, and a mobile originating voice call, or the state switching request cause is that an uplink radio frequency of the wireless communications apparatus is occupied.

In an optional implementation, the wireless communications apparatus further includes a timing module, and after the transceiver sends the first request message to the first cell, the processor is configured to: start the timing module, where timing duration of the timing module is minimum interval duration for the transceiver to send the first request message.

A frequency of sending the first request message can be effectively controlled by starting the timing module, thereby avoiding a signaling storm and improving system resource utilization.

In an optional implementation, the wireless communications apparatus further includes a counting module, and the processor is further configured to: increase a count value of the counting module by 1, the counting module is configured to count a quantity of sent first request messages, and the wireless communications apparatus stops sending the first request message when the value counted by the counting module is greater than N, where N is a maximum value of a quantity of times of sending the first request message, and N is an integer greater than 0.

In an optional implementation, the first request message is user equipment assistance information signaling, the first request message includes radio resource control RRC connection release request indication information, and the RRC connection release request indication information is used to request to release the wireless connection between the first user and the first cell.

This embodiment of this application provides the wireless communications apparatus. The wireless communications apparatus includes: a sending module, configured to send a connection change request message to a first cell in a first network, where the connection change request message includes an RRC connection preference (ConnectionPreference) information element or an RRC connection assistance (ConnectionAssistance) information element, and the RRC connection preference information element or the RRC connection assistance information element is used to request to change a wireless connection to the first cell, and a receiving module, configured to receive a response message from the first cell, where the response message is used to respond to the connection change request message, where the sending module is configured to send a connection establishment request message to a second cell, and the connection establishment request message is used to request to establish a wireless connection to the second cell in a second network.

This embodiment of this application provides the wireless communications apparatus. The wireless communications apparatus includes: a sending module, configured to send a connection release request message to a first cell in a first network, where the connection release request message includes an RRC connection preference (ConnectionPreference) information element or an RRC connection assistance (ConnectionAssistance) information element, and the RRC connection preference information element or the RRC connection assistance information element is used to request to change a wireless connection to the first cell, and a receiving module, configured to receive a response message from the first cell, where the response message is used to respond to the connection release message, where the sending module is configured to send a connection establishment request message to a second cell, and the connection establishment request message is used to request to establish a wireless connection to the second cell in a second network.

This embodiment of this application provides the wireless communications apparatus. The wireless communications apparatus includes: a sending module, configured to send a state change request message to a first cell in a first network, where the state change request message includes an RRC connection preference (ConnectionPreference) information element or an RRC connection assistance (ConnectionAssistance) information element, and the RRC connection preference information element or the RRC connection assistance information element is used to request to change a wireless connection to the first cell, and a receiving module, configured to receive a response message from the first cell, where the response message is used to respond to the state change request message, where the sending module is configured to send a connection establishment request message to a second cell, and the connection establishment request message is used to request to establish a wireless connection to the second cell in a second network.

According to a third aspect, an embodiment of this application provides a communication method, where that a wireless communications apparatus enables a first user to attach to a first network and maintains a wireless connection to a first cell in the first network, and the wireless communications apparatus enables a second user to attach to a second network and camps on a second cell in the second network includes: sending, by the wireless communications apparatus, a first request message to the first cell, where the first request message is used to request to release the wireless connection between the first user and the first cell, receiving, by the wireless communications apparatus, a response message from the first cell, where the response message is used to respond to the first request message, and sending, by the wireless communications apparatus, a second request message to the second cell, where the second request message is used to request to establish a wireless connection between the second user and the second cell.

In an optional implementation, the first user is in a connected state in the first cell, the response message includes first state indication information, and the first state indication information indicates an inactive state, a light connection state, or an idle state to which the first user is to switch, and after the receiving, by the wireless communications apparatus, a response message from the first cell, the method further includes: enabling, by the wireless communications apparatus, the first user to switch to the state indicated by the first state indication information in the first network.

In an optional implementation, the first user is in a connected state in the first cell, and the first request message includes second state indication information, and the second state indication information indicates an inactive state, a light connection state, or an idle state that the first user is to enter.

In an optional implementation, the first user is in a connected state in the first cell, and after the receiving, by the wireless communications apparatus, a response message from the first cell, the method further includes: enabling, by the wireless communications apparatus, the first user to switch to a preset state in the first network, where the preset state is an inactive state, a light connection state, or an idle state.

In an optional implementation, the first request message includes a state switching request cause, and the state switching request cause is that the second user performs any one of the following services in the second network: an emergency call, high priority access, mobile terminate-access, mobile originating signaling, mobile originating data, delay tolerant access, and a mobile originating voice call, or the state switching request cause is that an uplink radio frequency of the wireless communications apparatus is occupied.

In an optional implementation, after the sending, by the wireless communications apparatus, a first request message to the first cell, the method further includes: starting, by the wireless communications apparatus, a timing module, where timing duration of the timing module is minimum interval duration for a sending module to send the first request message.

In an optional implementation, the method further includes: counting, by the wireless communications apparatus through a counting module, a quantity of first request messages sent by the sending module, and stopping sending, by the wireless communications apparatus, the first request message when a value counted by the counting module is greater than N, where N is a maximum value of a quantity of times that the sending module sends the first request message, and N is an integer greater than 0.

In an optional implementation, the first request message is user equipment assistance information (UE Assistance Information) signaling, the first request message includes radio resource control RRC connection release request indication information, and the RRC connection release request indication information is used to request to release the wireless connection between the first user and the first cell.

In an optional implementation, the response message includes an uplink transmission resource configured for the wireless communications apparatus, and the uplink transmission resource is used to perform uplink data transmission when the first user restores transmission with the first network from the inactive state or the light connection state.

In an optional implementation, the method further includes: after enabling the first user to enter the inactive state, the light connection state, or the idle state, the wireless communications apparatus continues to maintain a timing advance timer, and stores an uplink timing value of the timing advance timer.

In an optional implementation, the following is further included: if the wireless communications apparatus enables the first user to determine, before restoring the wireless connection to the first network, that the timing advance timer does not expire, the first user performs uplink data transmission by using the stored uplink timing value, or performs uplink data transmission by using a current uplink timing value and a configured uplink transmission resource.

In an optional implementation, the following is further included: the wireless communications apparatus continues to listen to dedicated signaling sent by the first network, where the dedicated signaling is used to indicate a service establishment request, a paging request, or a new data radio bearer establishment request of the first user in the first network.

In an optional implementation, the dedicated signaling is physical downlink control channel (PDCCH) dedicated signaling.

In an optional implementation, before the sending, by the wireless communications apparatus, a first request message to the first cell, the method further includes: receiving a paging message sent by the second network, where the paging message includes service type indication information or service QoS information, a service indicated by the service type indication information is at least one of a voice service, a data service, a low-latency service, a high-reliability service, or a low-latency and high-reliability service, and the service QoS information includes at least one of service QCI indication information, service latency requirement indication information, and service reliability requirement indication information.

According to a fourth aspect, an embodiment of this application provides a wireless communications apparatus, configured to implement the method according to any one of the third aspect or the possible designs in the third aspect, and configured to implement the steps of the foregoing method.

According to a fifth aspect, an embodiment of this application provides a wireless communications apparatus. The wireless communications apparatus includes at least one processor, where the at least one processor is coupled to at least one memory, and the at least one processor is configured to execute a computer program or an instruction stored in the at least one memory, so that the wireless communications apparatus performs the method according to any one of the third aspect or the possible designs of the third aspect.

According to a sixth aspect, an embodiment of this application provides a computer-readable storage medium. The computer-readable storage medium stores a computer-readable instruction. When a computer reads and executes the computer-readable instruction, the computer is enabled to perform the method according to any one of the third aspect or the possible designs of the third aspect.

According to a seventh aspect, an embodiment of this application provides a computer program product. When a computer reads and executes the computer program product, the computer is enabled to perform the method according to any one of the third aspect or the possible designs of the third aspect.

According to an eighth aspect, an embodiment of this application provides a chip. The chip is connected to a memory, and is configured to read and execute a software program stored in the memory, to implement the method according to any one of the third aspect or the possible designs of the third aspect.

According to a ninth aspect, an embodiment of this application provides a chip. The chip is connected to a memory, and is configured to read and execute an instruction or configuration data stored in the memory, to implement the method according to any one of the third aspect or the possible designs of the third aspect.

DETAILED DESCRIPTION OF ILLUSTRATIVE EMBODIMENTS

The following describes the embodiments of this application in detail with reference to the accompanying drawings in this specification.

The embodiments of this application may be applied to various mobile communications systems, for example, a new radio (NR) system, a global system for mobile communications (GSM) system, a code division multiple access (CDMA) system, a wideband code division multiple access (WCDMA) system, a general packet radio service (GPRS) system, a long term evolution (LTE) system, a long term evolution-advanced (LTE-A) system, a universal mobile telecommunications system (UMTS), an evolved long term evolution (eLTE) system, a future communications system, and another communications system. Specifically, this is not limited herein.

Figure 1:
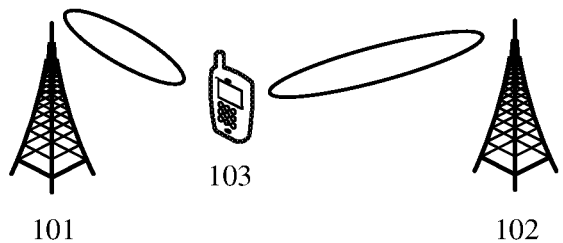
FIG. 1 is a schematic diagram of a communications system to which a communication method according to an embodiment of this application is applicable.

For ease of understanding the embodiments of this application, a communications system shown in FIG. 1 is first used as an example to describe in detail a communications system to which the embodiments of this application are applicable. FIG. 1 is a schematic diagram of a communications system to which a communication method according to an embodiment of this application is applicable. As shown in FIG. 1, a first network includes a network device 101, and a second network includes a network device 102. A wireless communications apparatus 103 may simultaneously enable two users to attach to a cell of the network device 101 and a cell of the network device 102, enable one user to maintain a wireless connection to the cell of the network device 101, and enable the other user to camp on the cell of the network device 102. The wireless communications apparatus 103 has a dual-receive single-transmit capability. To be specific, the wireless communications apparatus 103 may receive, at the same time, downlink data transmitted by the network device 101 and downlink data transmitted by the network device 102, and send uplink data to the network device 101 or the network device 102.

It should be noted that, in this embodiment of this application, a "user" is a logical concept, and the "user" may correspond to a subscriber identity module (SIM) card, subscriber information, a virtual SIM card, or a subscriber identity (for example, an international mobile subscriber identity (IMSI)/a temporary mobile subscriber identity (TMSI)), but is not limited to a natural person user, a physical terminal (a mobile phone), or the like. From a perspective of a network side, different "users" logically correspond to different communications entities served by the network side. For example, a terminal having a dual registration function is equivalent to two communications entities for the network side. For another example, when the "user" corresponds to the SIM card or the subscriber information, the network side identifies two terminals having different SIM cards or different subscriber information as two different communications entities, or identifies a same terminal device having a plurality of different SIM cards or a plurality of pieces of subscriber information as a plurality of different communications entities, even though actually, the terminal having the plurality of different SIM cards or the plurality of pieces of subscriber information is only one physical entity.

In this embodiment of this application, the wireless communications apparatus may be a terminal, or may be a chip. When the wireless communications apparatus is a chip, the wireless communications apparatus may be a system-on-a-chip (SoC) master chip or a baseband modem chip, and the chip may be applied to the terminal. When the wireless communications apparatus is a terminal, the wireless communications apparatus may also be referred to as user equipment (UE), an access terminal, a subscriber unit, a subscriber station, a mobile station, a remote station, a remote terminal, a mobile device, a user terminal, a wireless communications device, a user agent, or a user apparatus.

Figure 2:
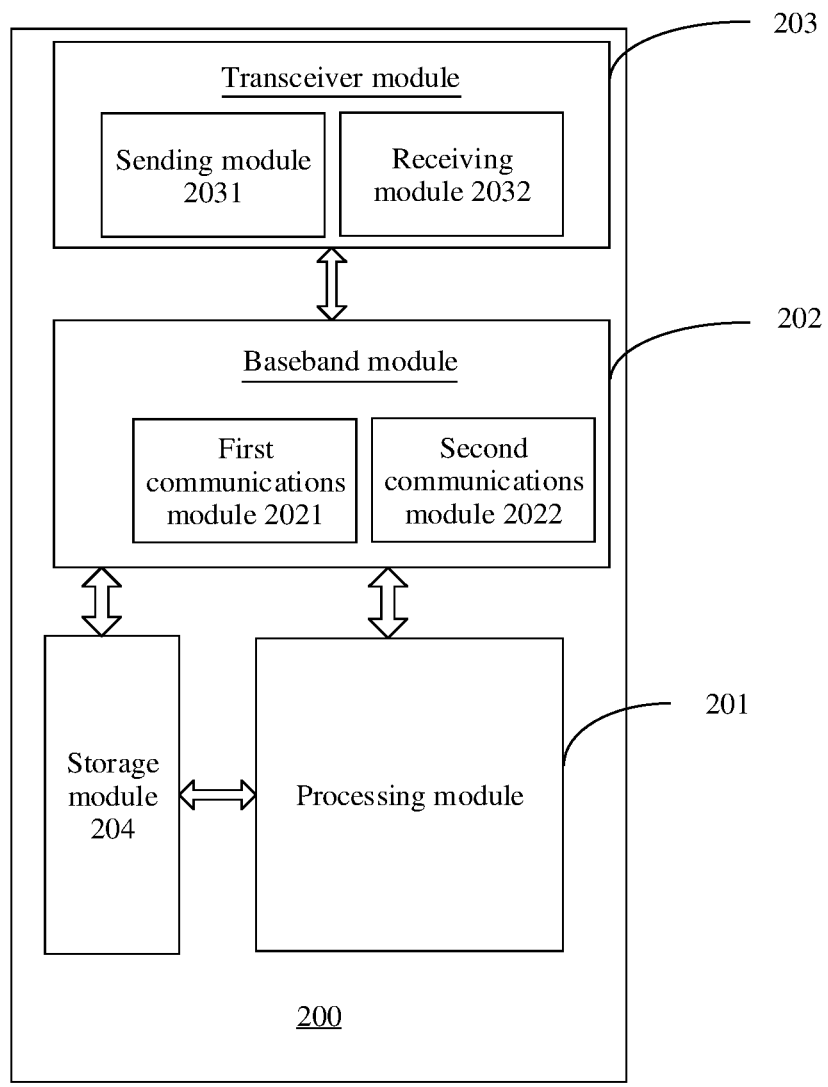
FIG. 2 is a schematic structural diagram of a wireless communications apparatus according to an embodiment of this application.

With reference to the foregoing descriptions, FIG. 2 is a schematic structural diagram of a wireless communications apparatus according to an embodiment of this application.

The wireless communications apparatus 200 shown in FIG. 2 includes a processing module 201, a baseband module 202, a transceiver module 203, a storage module 204, and the like. The processing module 201 is mainly configured to: control the entire wireless communications apparatus 200, execute a software program, and process data of the software program. The baseband module 202 is mainly configured to process a communication protocol and communication data, for example, perform channel coding, multiplexing, modulation, and spectrum spreading. The wireless communications apparatus 200 may enable a first user and a second user to attach to different networks at the same time. Correspondingly, the baseband module 202 may include a first communications module 2021 and a second communications module 2022. Specifically, the first communications module 2021 may obtain identity information of the first user, establish protocol stack information associated with the first user, and the like. The first communications module 2021 is configured to enable the first user to attach to a first network, that is, enable a terminal (or UE) to attach to the first network as an identify of the first user. The second communications module 2022 may obtain identity information of the second user, establish protocol stack information associated with the second user, and the like. The second communications module 2022 is configured to enable the terminal (or the UE) to attach to the second network as an identify of the second user. The first network may be an LTE network, an NR network, or the like. The second network may be an LTE network, an NR network, or the like. This is not limited in this embodiment of this application.

It should be noted that the processing module 201 and the baseband module 202 may separately be independent modules, or may be combined into one module. When the processing module 201 and the baseband module 202 are combined into one module, the module has a function including functions of the processing module 201 and the baseband module 202, and the module may be an independent terminal, an independent chip, or the like.

A module that is in the transceiver module 203 and that is configured to implement a sending function is considered as a sending module 2031, and a module that is in the transceiver module 203 and that is configured to implement a receiving function is considered as a receiving module 2032. To be specific, the transceiver module 203 includes the sending module 2031 and the receiving module 2032, the receiving module 2032 may also be referred to as a receiver, an input interface, a receiver circuit, or the like, and the sending module 2031 may be referred to as a transmitter machine, a transmitter, an output interface, a transmitter circuit, or the like.

The foregoing modules may be function modules implemented through software code, or may be function modules implemented through a hardware circuit, or function modules implemented by combining software and hardware. This is not limited in this embodiment of this application.

In this embodiment of this application, the first communications module 2021 in the wireless communications apparatus 200 may maintain a wireless connection between the first user and a first cell in the first network after enabling the first user to attach to the first network. The wireless connection may be that the first user is in a connected state in the first cell, and the connected state may be a radio resource control (RRC) connected state. The second communications module 2022 in the wireless communications apparatus 200 enables the second user to camp on a second cell in the second network after enabling the second user to attach to the second network.

In this case, the wireless communications apparatus 200 may be in the connected state in the first cell in the first network, to perform an operation such as data transmission with the first cell, and camp on the second cell in the second network, and listen to signaling such as paging signaling sent by the second cell to the wireless communications apparatus 200.

Figure 3:
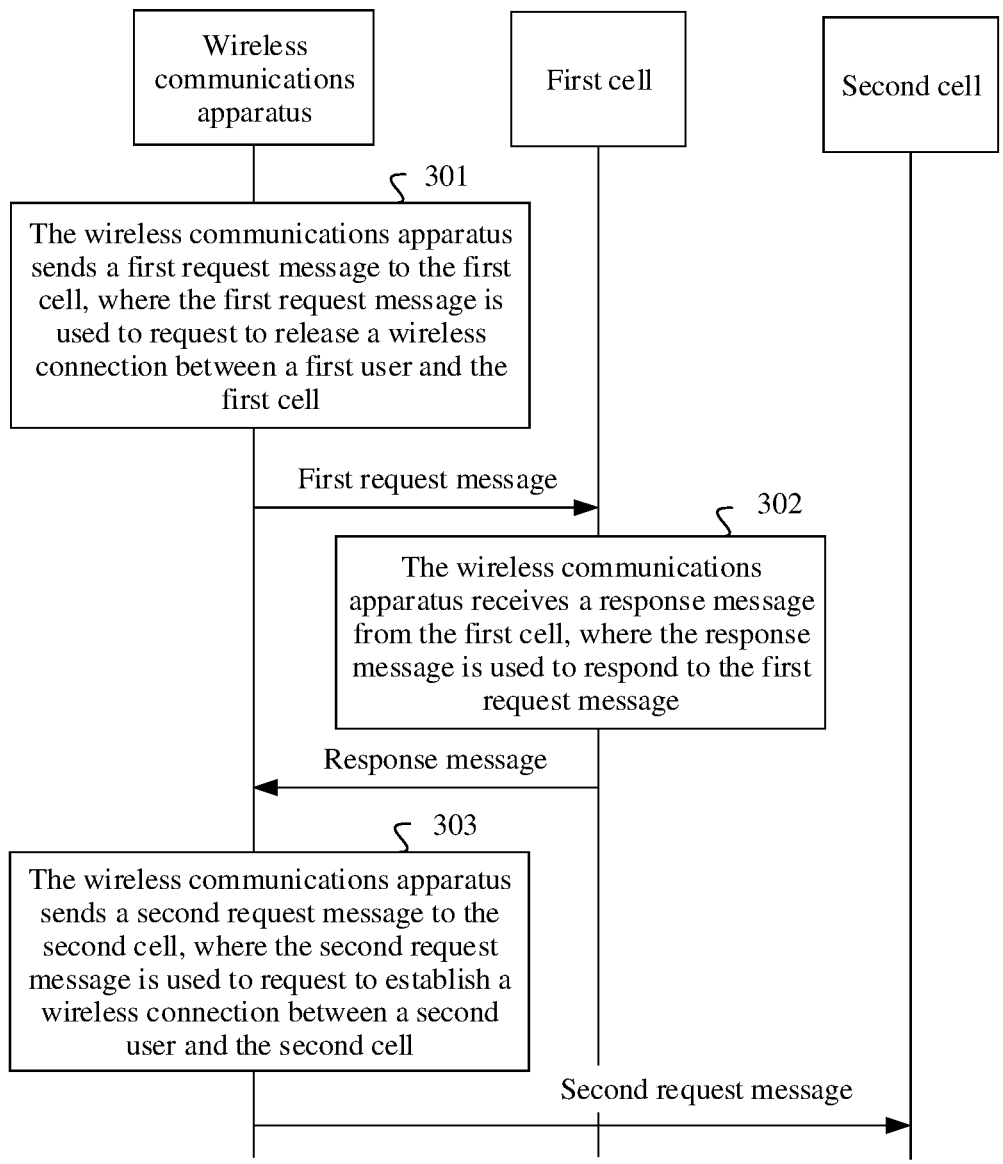
FIG. 3 is a schematic flowchart of a communication method according to an embodiment of this application.

When the wireless communications apparatus 200 needs to perform data transmission in the second network, a communication method shown in FIG. 3 may be performed.

Step 301: The wireless communications apparatus sends a first request message to the first cell, where the first request message is used to request to release the wireless connection between the first user and the first cell.

Optionally, in this embodiment of this application, the first request message includes but is not limited to a meaning or a function in step 301. For example, the first request message sent by the wireless communications apparatus may be alternatively used to request to switch a state of the wireless communications apparatus in the first cell, or the first request message sent by the wireless communications apparatus may be alternatively used to request to change the wireless connection between the first user and the first cell.

Step 302: The wireless communications apparatus receives a response message from the first cell, where the response message is used to respond to the first request message.

Step 303: The wireless communications apparatus sends a second request message to the second cell, where the second request message is used to request to establish a wireless connection between the second user and the second cell.

Before step 301, in a possible case, the wireless communications apparatus may receive paging signaling sent by the second cell, and the paging signaling is used to page the wireless communications apparatus to perform a service in the second network. After receiving the paging signaling of the second cell, the wireless communications apparatus performs step 301.

For example, the paging signaling may be used to page the wireless communications apparatus to perform any one of the following services in the second network, including an emergency call (emergency), high priority access (highPriorityAccess), mobile terminate-access (mobile terminate-Access, mt-Access), mobile originating signaling (mobile originatingSignaling, mo-Signaling), mobile originating data (mobile originatingData, mo-Data), delay tolerant access (delayTolerantAccess), and a mobile originating voice call (mobile originatingVoiceCall, mo-VoiceCall).

Certainly, the foregoing is merely an example. The paging signaling may alternatively page the wireless communications apparatus to perform another type of service in the second network. Examples are not described one by one herein.

In this embodiment of this application, the paging signaling may include at least one of service type indication information and service QoS information.

A service indicated by the service type indication information is at least one of a voice service, a data service, a low-latency service, a high-reliability service, or a low-latency and high-reliability service, and the service QoS information includes at least one of service QCI indication information, service latency requirement indication information, and service reliability requirement indication information.

Optionally, if the wireless communications apparatus performs a data transmission service in the first network, when a priority of the service that the paging signaling pages the wireless communications apparatus to perform in the second network is higher than that of the data transmission service that is performed by the wireless communications apparatus in the first network, steps 301 to 303 are performed, otherwise, steps 301 to 303 may not be performed.

Before step 301, in another possible case, the wireless communications apparatus actively initiates a service establishment process to the second cell, and the wireless communications apparatus performs steps 301 to 303.

Optionally, if the wireless communications apparatus performs the data transmission service in the first network, a priority of a service to be established in a service establishment process actively initiated by the wireless communications apparatus to the second cell is higher than the priority of the data transmission service that is performed by the wireless communications apparatus in the first network.

Optionally, in step 301, the first request message may be RRC signaling, for example, may be user equipment assistance information (UE Assistance Information) signaling. Correspondingly, in step 302, the response message sent by the first cell may be an RRC connection reestablishment message, an RRC connection release message, an RRC connection reconfiguration message, or the like.

In this embodiment of this application, the first request message may use an existing message, an information element (IE) may be added to the first request message, and the added IE is used to indicate a state that the wireless communications apparatus prefers in the first network, or indicate a request for releasing or changing the wireless connection between the first user and the first cell.

For example, the first request message may be UE Assistance Information signaling in the existing 3rd generation partnership project (3GPP) 36331 protocol. In this case, the first request message may include a newly added IE: rrc-ConnectionPreference-r15. Specifically, the first request message may be as follows:

```
UEAssistanceInformation-v1500-IEs ::=            SEQUENCE {
...
rrcConnectionPreference -r15                     SEQUENCE {
    state-Preference-r15                             State-Preference-r15
OPTIONAL,
    } OPTIONAL
...
rlm-Report-r14                                   SEQUENCE {
    rlm-Event-r14                                    ENUMERATED
{earlyOutOfSync, earlyInSync},
    excessRep-MPDCCH-r14                             ENUMERATED {excessRep1,
excessRep2}     OPTIONAL
}
                                                 OPTIONAL, delayBudgetReport-r14
            DelayBudgetReport-r14
OPTIONAL,
nonCriticalExtension                             SEQUENCE { }
            OPTIONAL
}
BW-Preference-r14 ::= SEQUENCE {
dl-Preference-r14       ENUMERATED               {mhz1dot4, mhz5, mhz20 }
            OPTIONAL,
ul-Preference-r14       ENUMERATED               {mhz1dot4, mhz5}
            OPTIONAL
}
...
}
``` rrcConnectionPreference-r15 indicates the state (or referred to as an RRC state) that the wireless communications apparatus prefers in the first network. Values associated with different states are different, and a value of rrcConnectionPreference-r15 is a value associated with the state that the wireless communications apparatus prefers. For example, a value associated with an inactive state is A, a value associated with alight connection state is B, a value associated with an idle state is C, and a value associated with a connected state is D. When the wireless communications apparatus prefers the light connection state, the value of rreConnectionPreference-r15 in the first request message is B. Details may be:

```
UEAssistanceInformation-v1500-IEs ::=       SEQUENCE {
...
rrcConnectionPreference -r15         SEQUENCE {
    B
    }
}
```

Optionally, the information element rrcConnectionPreference-r15 in the first request message may be alternatively replaced with any one of the following information elements:

```
        rrcConnectionPreference -r15          SEQUENCE {
                state-Preference-r15                  State-Preference-r15
        OPTIONAL,
                ul-Rf-Preference-r15                  UL-RF-Preference-r15
        OPTIONAL,
                } OPTIONAL
   or   rrcConnectionPreference -r15          SEQUENCE {
                ul-Rf-Preference-r15                  UL-RF-Preference-r15
        OPTIONAL,
                } OPTIONAL
   or   rrcConnectionAssistance -r15          SEQUENCE {
                state-Preference-r15                  State-Preference-r15
        OPTIONAL,
                } OPTIONAL
   or   rrcConnectionAssistance -r15          SEQUENCE                   {
                state-Preference-r15                  State-Preference-r15
OPTIONAL,
                ul-Rf-Preference-r15                  UL-RF-Preference-r15
OPTIONAL,
                }                                                OPTIONAL,
}
   or   rrcConnectionAssistance -r15          SEQUENCE                   {
                ul-Rf-Preference-r15                  UL-RF-Preference-r15
OPTIONAL,
                }                                                OPTIONAL
   or   rrcConnectionReleaseRequest -r15      SEQUENCE                   {
                state-Preference-r15                  State-Preference-r15
OPTIONAL,
                }                                                OPTIONAL
   or   rrcConnectionReleaseRequest -r15      SEQUENCE                   {
                state-Preference-r15                  State-Preference-r15
OPTIONAL,
                ul-Rf-Preference-r15                  UL-RF-Preference-r15
OPTIONAL,
                }                                                OPTIONAL
   or   rrcConnectionReleaseRequest -r15      SEQUENCE                   {
                ul-Rf-Preference-r15                  UL-RF-Preference-r15
OPTIONAL,
                }                                                OPTIONAL
   or         State-Preference-r15          ::=       SEQUENCE           {
   state             ENUMERATE    {idle, inactive, light, maintenance/connected }
                          OPTIONAL
}
   or                 UL-RF-Preference-r15::=         SEQUENCE           {
   ul-Rf             ENUMERATED   {single, dual, triple, four }
                  OPTIONAL
```

Certainly, the foregoing is merely an example. The first request message may alternatively include other content, and rrcConnectionPreference-r15 may alternatively be in another form. Examples are described one by one herein.

Optionally, the first request message may be alternatively a connection release request message, a connection change request message, a state change request message, or the like. In this case, for a specific structure of the first request message, refer to the descriptions when the first request message is UE assistance information signaling. Details are not described herein again.

Certainly, the first request message may be alternatively higher layer signaling such as a media access control (MAC) control element (CE). Details are not described herein.

In this embodiment of this application, steps 301 and 302 may have different scenarios. The following provides detailed descriptions.

In a first possible scenario in this embodiment of this application, after the wireless communications apparatus sends the first request message and receives the response message from the first cell, the wireless communications apparatus enables the first user to switch to a preset state in the first network, where the preset state is an inactive state, a light connection state, or an idle state. The inactive state may be an RRC inactive state.

It should be noted that the preset state is agreed on by the wireless communications apparatus and the network side in advance, and how to specifically agree on the preset state is not limited in this embodiment of this application.

In this scenario, the first request message may include connection release indication information, and the connection release indication information may also be referred to as RRC connection release request indication information (rrcConnectionReleaseRequest, rrcConnRelRequest, or rrcConnRelReq), or referred to as RRC connection assistance indication information (rrcConnectionAssistance, rrcConnAssistance, or rrcConnAssis).

In a first possible implementation, the connection release indication information includes K bits, and K is an integer greater than 0. When a value of the connection release indication information is a first value, it indicates that the wireless connection between the first user and the first cell is requested to be released, or when a value of the connection release indication information is a second value, it indicates that the wireless connection between the first user and the first cell is requested to be maintained (or referred to as "not released"). The second value is a value other than the first value. For example, the connection release indication information includes one bit, the first value is 1, and the second value is 0. When the value of the connection release indication information is 1, it indicates that the wireless connection between the first user and the first cell is requested to be released, or when the value of the connection release indication information is 0, it indicates that the wireless connection between the first user and the first cell is requested to be maintained.

In a second possible implementation, a value type of the connection release indication information may be alternatively a Boolean type, which is specifically as follows: When the value of the connection release indication information is 1, it indicates that the wireless connection between the first user and the first cell is requested to be released, or when the value of the connection release indication information is 0, it indicates that the wireless connection between the first user and the first cell is requested to be maintained. Alternatively, when the value of the connection release indication information is 1, it indicates that the wireless connection between the first user and the first cell is requested to be maintained, or when the value of the connection release indication information is 0, it indicates that the wireless connection between the first user and the first cell is requested to be released.

In a third possible implementation, when the first request message includes the connection release indication information, it indicates that the wireless connection between the first user and the first cell is requested to be released, or when the first request message does not include the connection release indication information, it indicates that the wireless connection between the first user and the first cell is requested to be maintained.

In a fourth possible implementation, when the first request message does not include the connection release indication information, it indicates that the wireless connection between the first user and the first cell is requested to be released, or when the first request message includes the connection release indication information, it indicates that the wireless connection between the first user and the first cell is requested to be maintained.

In this scenario, signaling exchanged between the wireless communications apparatus and the first cell occupies a few resources, and after receiving the response message from the first cell, the wireless communications apparatus may release the wireless connection between the first user and the first cell, to quickly establish the wireless connection to the second cell, thereby reducing a delay of establishing a service in the second cell.

In a second possible scenario in this embodiment of this application, the response message received by the wireless communications apparatus includes first state indication information, and the first state indication information indicates the first user to switch to the inactive state, the light connection state, or the idle state. The first state indication information may also be referred to as RRC connection preference indication information (rrcConnectionPreference, rrcConnPreference, or rrcConnPref).

After the wireless communications apparatus receives the response message from the first cell, the wireless communications apparatus enables the first user to switch, in the first network, to the state indicated by the first state indication information.

In this scenario, the first cell may switch the first user to a corresponding state based on an actual situation, so that implementation is more flexible.

In a third possible scenario in this embodiment of this application, the first request message sent by the wireless communications apparatus may include second state indication information, and the second state indication information indicates the first user to enter the inactive state, the light connection state, or the idle state.

In this scenario, the wireless communications apparatus may determine a preferred state based on a factor such as occupation of a current resource, to indicate the preferred state by using the second state indication information.

After receiving the first request message, the first cell may indicate the wireless communications apparatus to switch the state of the first user in the first cell to the state indicated by the second state indication information, or may indicate the wireless communications apparatus to switch the state of the first user in the first cell to another state. This is not limited in this embodiment of this application.

Optionally, in step 301, the first request message sent by the wireless communications apparatus may further include a state switching request cause.

For example, the state switching request cause is that the second user performs any one of the following services in the second network:

an emergency call, high priority access, mobile terminate-access, mobile originating signaling, mobile originating data, delay tolerant access, and a mobile originating voice call.

For another example, the state switching request cause is that an uplink radio frequency of the wireless communications apparatus is occupied.

Certainly, the foregoing is merely an example, and the state switching request cause may be another cause. Examples are not described one by one herein.

Optionally, after the wireless communications apparatus sends the first request message to the first cell, the wireless communications apparatus may further start a timing module. Timing duration of the timing module is minimum interval duration for the sending module to send the first request message. In this case, before the timing module expires, the wireless communications apparatus no longer sends the first request message to the first cell. If the wireless communications apparatus can send the first request message only once, the wireless communications apparatus no longer sends the first request message to the first cell after the timing module expires.

Further, after the wireless communications apparatus sends the first request message to the first cell, the wireless communications apparatus may further increase a count value of a counting module by 1. The counting module is configured to count a quantity of first request messages sent by the sending module. The wireless communications apparatus stops sending the first request message when the value counted by the counting module is greater than N, where N is a maximum value of a quantity of times that the wireless communications apparatus sends the first request message, and N is an integer greater than 0. Correspondingly, after the timing module expires, the wireless communications apparatus no longer sends the first request message to the first cell when the value counted by the counting module is greater than N. After the timing module expires, the wireless communications apparatus may send the first request message to the first cell again when the value counted by the counting module is less than or equal to N.

It should be noted that the timing duration of the timing module and the value of N may be preconfigured by the first cell for the wireless communications apparatus. For example, the timing duration of the timing module and the value of N are broadcast to the wireless communications apparatus, or the timing duration of the timing module and the value of N may be sent to the wireless communications apparatus by using RRC signaling. This is not limited in this embodiment of this application.

Optionally, in step 301, the first request message sent by the wireless communications apparatus may be used to request to maintain the wireless connection between the first user and the first cell. However, the wireless communications apparatus cannot enable the first user to send uplink data to the first cell. According to the foregoing method, the first network may still notify, by using dedicated signaling, the first user whether there is a new service to be established, thereby improving service establishment efficiency.

In step 302, the response message may include an uplink transmission resource (uplink grant resource) configured for the wireless communications apparatus, and the uplink transmission resource is used to perform uplink data transmission when the first user restores transmission with the first network from the inactive state or the light connection state.

According to the method, when restoring the wireless connection to the first network, the wireless communications apparatus can quickly restore uplink synchronization with the first network and perform data transmission by using the uplink transmission resource.

Optionally, after enabling the first user to enter the inactive state, the light connection state, or the idle state, the wireless communications apparatus continues to maintain a timing advance timer (TAT), and stores an uplink timing value of the timing advance timer. In this case, when the wireless communications apparatus enables the first user to determine, before restoring the wireless connection to the first network, that the timing advance timer does not expire, the wireless communications apparatus performs uplink data transmission based on the uplink timing value stored for the first user, or performs uplink data transmission based on a current uplink timing value and a configured uplink transmission resource.

Optionally, after the wireless communications apparatus enables the first user to enter the inactive state, the light connection state, or the idle state, the wireless communications apparatus continues to listen to dedicated signaling sent by the first network.

The dedicated signaling is used to indicate a service establishment request, a paging request, or a new data radio bearer establishment request of the first user in the first network. For example, the dedicated signaling may be physical downlink control channel (PDCCH) dedicated signaling.

According to the foregoing method, the first network may still notify, by using the dedicated signaling, the first user whether there is a new service to be established, for example, a new data radio bearer (DRB) establishment request, which is equivalent to indicating, through paging, the first user to establish a new service.

In step 303, the wireless connection between the second user and the second cell that the wireless communications apparatus requests to establish may be an RRC connection. Correspondingly, the second request message may be an RRC connection establishment request message.

Optionally, the second request message may include an establishment cause value. For example, the establishment cause value is that the second user performs any one of the following services in the second network, including an emergency call, high priority access, mobile terminate-access, mobile originating signaling, mobile originating data, delay tolerant access, and a mobile originating voice call.

After enabling the second user to establish the wireless connection to the second cell, the wireless communications apparatus may perform data transmission with the second cell. Correspondingly, the wireless communications apparatus is in the inactive state, the light connection state, or the idle state in the first cell.

The following describes the foregoing process by using a specific embodiment.

Figure 4:
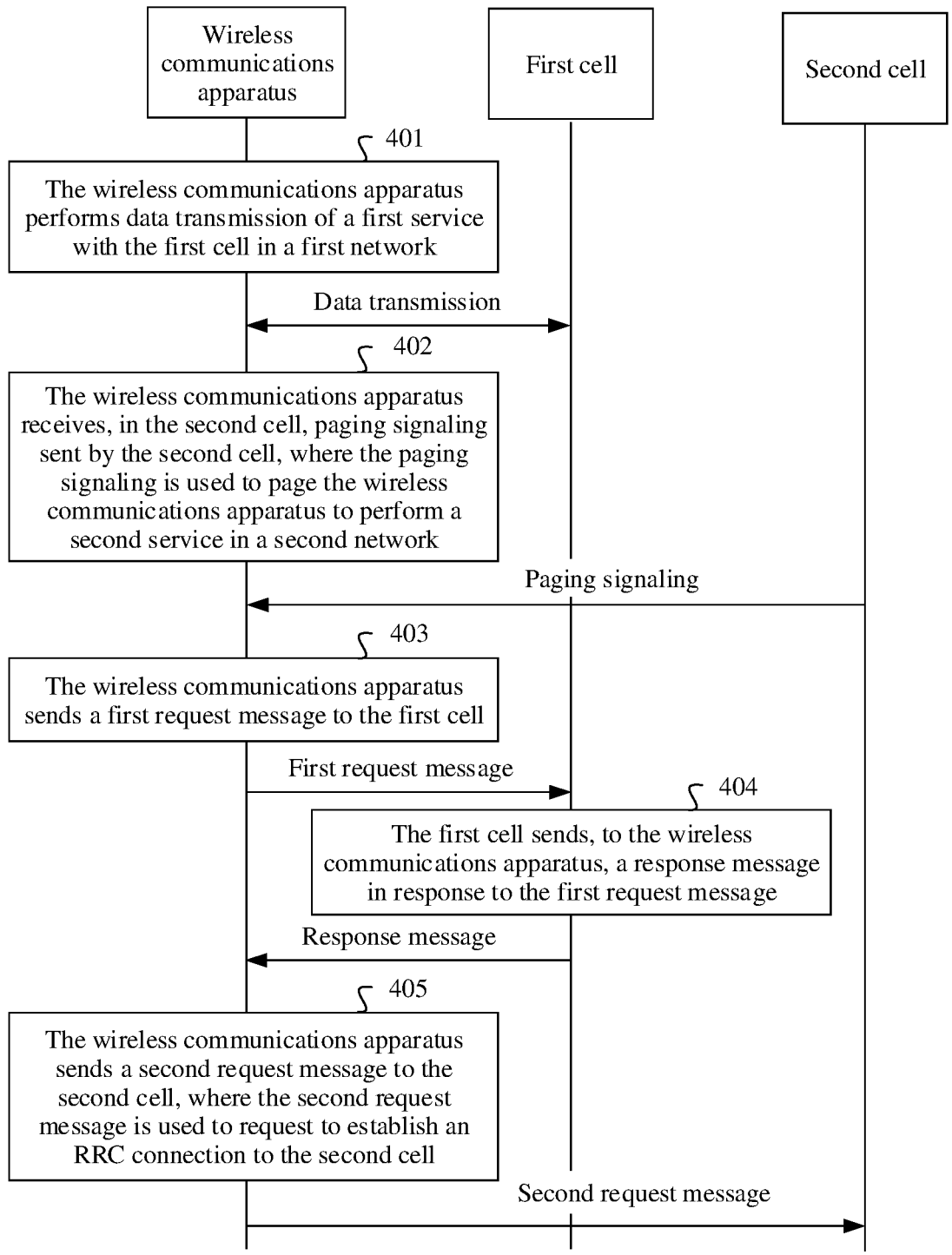
FIG. 4 is a schematic flowchart of a communication method according to an embodiment of this application.

FIG. 4 is a schematic flowchart of a communication method according to an embodiment of this application.

In FIG. 4, a wireless communications apparatus may attach to a first network and a second network at the same time. Currently, the wireless communications apparatus maintains an RRC connection to a first cell in the first network, and camps on a second cell in the second network. In this case, the wireless communications apparatus may listen to radio signaling sent by the second cell.

Step 401: The wireless communications apparatus performs data transmission of a first service with the first cell in the first network.

A type of the first service is not limited in this embodiment of this application, and details are not described herein.

Step 402: The wireless communications apparatus receives, in the second cell, paging signaling sent by the second cell, where the paging signaling is used to page the wireless communications apparatus to perform a second service in the second network.

A priority of the second service may be higher than a priority of the first service.

Certainly, in step 402, alternatively, the wireless communications apparatus may actively initiate a second service establishment process to the second cell.

Step 403: The wireless communications apparatus sends a first request message to the first cell.

The first request message is used to request to release a wireless connection to the first cell.

The first request message may include connection release indication information, and a value of the connection release indication information being 1 indicates that the wireless connection to the first cell is requested to be released.

Step 404: The first cell sends, to the wireless communications apparatus, a response message in response to the first request message.

After receiving the response message, the wireless communications apparatus may switch to a preset state in the first cell.

Certainly, when the response message includes first state indication information, the wireless communications apparatus may switch, in the first cell, to a state indicated by the first state indication information.

The first request message and the response message may further include other content. Details are not described herein.

Step 405: The wireless communications apparatus sends a second request message to the second cell, where the second request message is used to request to establish an RRC connection to the second cell.

After establishing the RRC connection to the second cell, the wireless communications apparatus may perform data transmission of a second service. A specific process is not described herein.

The foregoing describes in detail the communication method in the embodiments of this application with reference to the accompanying drawings, and the following describes in detail the wireless communications apparatus in the embodiments of this application with reference to the accompanying drawings.

Figure 5:
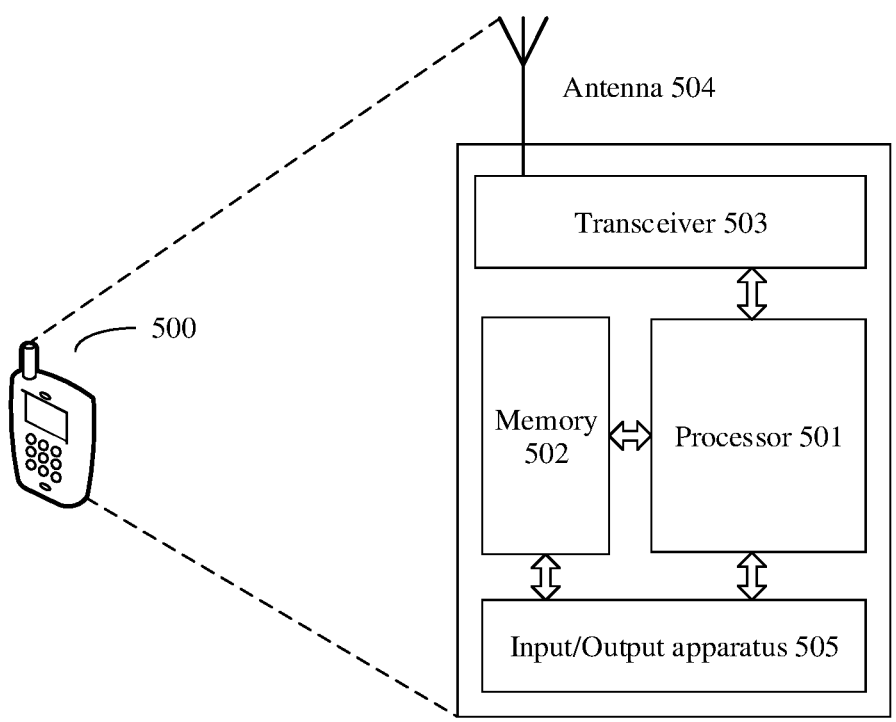
FIG. 5 is a schematic structural diagram of a wireless communications apparatus according to an embodiment of this application.

FIG. 5 is a schematic structural diagram of a wireless communications apparatus according to an embodiment of this application. The wireless communications apparatus shown in FIG. 5 may be an implementation of a hardware circuit of the wireless communications apparatus shown in FIG. 2. The wireless communications apparatus is applicable to functions for performing the wireless communications apparatus in the foregoing method embodiment in the flowchart shown in FIG. 3 or FIG. 4. For ease of description, FIG. 5 shows only main components of the wireless communications apparatus. As shown in FIG. 5, the wireless communications apparatus 500 includes a processor 501, a memory 502, a transceiver 503, an antenna 504, and an input/output apparatus 505. The processor 501 is mainly configured to: process a communication protocol and communication data, control the entire wireless communications apparatus, execute a software program, and process data of the software program. For example, the processor 501 is configured to support the wireless communications apparatus in performing the action described in the foregoing method embodiments, for example, sending a first request message to a first cell. The memory 502 is mainly configured to store the software program and data. The transceiver 503 is mainly configured to: perform conversion between a baseband signal and a radio frequency signal, and process the radio frequency signal. The antenna 504 is mainly configured to receive and send a radio frequency signal in a form of an electromagnetic wave. The input/output apparatus 505, such as a touchscreen, a display, or a keyboard, is mainly configured to: receive data input by a user, and output data to the user.

After the wireless communications apparatus 500 is powered on, the processor 501 may read the software program in the memory 502, to perform the following procedure: enabling the terminal to attach to a first network as an identity of a first user, and maintaining a wireless connection to a first cell in the first network, and enabling the terminal to attach to a second network as an identity of a second user, and camping on a second cell in the second network.

The transceiver 503 is configured to send a first request message to the first cell, where the first request message is used to request to release the wireless connection between the first user and the first cell.

The transceiver 503 is configured to receive a response message from the first cell, where the response message is used to respond to the first request message.

The transceiver 503 is further configured to send a second request message to the second cell, where the second request message is used to request to establish a wireless connection between the second user and the second cell.

A person skilled in the art may understand that for ease of description, FIG. 5 shows only one memory and one processor. In an actual wireless communications apparatus, there may be a plurality of processors and a plurality of memories. The memory may also be referred to as a storage medium, a storage device, or the like. This is not limited in this embodiment of this application.

In an optional implementation, the wireless communications apparatus is in a connected state in the first cell as the identity of the first user, the response message includes first state indication information, and the first state indication information indicates an inactive state, a light connection state, or an idle state to which the first user is to switch, and the processor 501 is further configured to enable the first user to switch to the state indicated by the first state indication information in the first network.

Because the response message includes the first state indication information, the wireless communications apparatus may directly determine the state of the first user in the first cell based on the first state indication information, thereby reducing a state switching delay and improving system efficiency.

In an optional implementation, the wireless communications apparatus is in a connected state in the first cell as the identity of the first user, and the first request message includes second state indication information, and the second state indication information indicates an inactive state, a light connection state, or an idle state that the first user is to enter.

The wireless communications apparatus indicates, by using the second state indication information, the state that the first user needs to maintain in the first cell, so that a network side can relatively quickly determine the state that is in the first cell for the wireless communications apparatus, thereby improving system efficiency.

In an optional implementation, the wireless communications apparatus is in a connected state in the first cell as the identity of the first user, and after the transceiver 503 receives the response message from the first cell, the first communications module is further configured to enable the first user to switch to a preset state in the first network, where the preset state is an inactive state, a light connection state, or an idle state.

In an optional implementation, the first request message includes a state switching request cause, and the state switching request cause is that the second user performs any one of the following services in the second network: an emergency call, high priority access, mobile terminate-access, mobile originating signaling, mobile originating data, delay tolerant access, and a mobile originating voice call, or the state switching request cause is that an uplink radio frequency of the wireless communications apparatus is occupied.

In an optional implementation, the wireless communications apparatus further includes a timing module, and after the transceiver 503 sends the first request message to the first cell, the processor 501 is configured to: start the timing module, where timing duration of the timing module is minimum interval duration for the sending module to send the first request message.

A frequency of sending the first request message can be effectively controlled by starting the timing module, thereby avoiding a signaling storm, and improving system resource utilization.

In an optional implementation, the wireless communications apparatus further includes a counting module, and the processor 501 is further configured to: increase a count value of the counting module by 1, where the counting module is configured to count a quantity of sent first request messages, and the wireless communications apparatus stops sending the first request message when the value counted by the counting module is greater than N, where N is a maximum value of a quantity of times of sending the first request message, and N is an integer greater than 0.

In an optional implementation, the first request message is user equipment assistance information signaling, the first request message includes radio resource control RRC connection release request indication information, and the RRC connection release request indication information is used to request to release the wireless connection between the first user and the first cell.

An embodiment of this application further provides a computer-readable medium. The computer-readable medium stores a computer program. When the computer program is executed by a computer, the method according to any method embodiment is implemented.

An embodiment of this application further provides a computer program product. When the computer program product is executed by a computer, the method according to any method embodiment is implemented.

It should be understood that, the processor in the embodiments of this application may be a central processing unit (Central Processing Unit, CPU), or may be another general-purpose processor, a digital signal processor (DSP), an application-specific integrated circuit (ASIC), a field programmable gate array (FPGA), or another programmable logical device, discrete gate or transistor logical device, discrete hardware component, or the like. The general-purpose processor may be a microprocessor, or the processor may be any conventional processor or the like.

All or some of the foregoing embodiments may be implemented by using software, hardware (for example, a circuit), firmware, or any combination thereof. When software is used to implement the embodiments, all or some of the foregoing embodiments may be implemented in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave) manner. The computer-readable storage medium may be any usable medium accessible by the computer, or a data storage device, such as a server or a data center, including one or more usable medium sets. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification is usually a simplified form of "and/or".

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, an access network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communications apparatus, comprising:
at least one processor and at least one transceiver, wherein the at least one processor is configured to execute at least one program to cause the at least one transceiver to perform:
sending user equipment assistance information to a first network network requesting to release a first wireless connection between the wireless communications apparatus and the first network using a first subscriber identity module (SIM) of the wireless communications apparatus, wherein the first SIM is in a connected state in the first network, the user equipment assistance information comprises second state indication information, and the second state indication information indicates an inactive state, a light connection state, or an idle state that the first SIM is to enter;

receiving a radio resource control (RRC) connection release message from the first network; and sending a connection establishment request message to a second network requesting to establish a second wireless connection between the wireless communications apparatus and the second network using a second SIM of the wireless communications apparatus.

2. The wireless communications apparatus according to claim 1, wherein, the RRC connection release message comprises first state indication information, and the first state indication information indicates the inactive state, the light connection state, or the idle state to which the first SIM is to enter; and the at least one processor is further configured to execute the at least one program to switch the first SIM to a state indicated by the first state indication information.

3. The wireless communications apparatus according to claim 1, wherein after receiving the RRC connection release from the first network, the at least one processor is further configured to execute the at least one program to switch the first SIM to a preset state in the first network, wherein the preset state is the inactive state, the light connection state, or the idle state.

4. The wireless communications apparatus according to claim 1, wherein the user equipment assistance information comprises a state switching request cause; and wherein the state switching request cause comprises information indicating that the second SIM performs any one of following services in the second network: an emergency call, high priority access, mobile terminate-access, mobile originating signaling, mobile originating data communication, delay tolerant access, or a mobile originating voice call; or wherein the state switching request cause comprises information indicating that an uplink radio frequency of the wireless communications apparatus is occupied.

5. The wireless communications apparatus according to claim 1, wherein the user equipment assistance information comprises RRC connection release request indication information, and the RRC connection release request indication information requests to release the first wireless connection between the wireless communications apparatus and the first network using the first SIM of the wireless communications apparatus.

6. The wireless communications apparatus according to claim 1, wherein before sending the user equipment assistance information, the first SIM is attached to the first network and the first wireless communications apparatus maintains the first wireless connection with a first cell in the first network.

7. The wireless communications apparatus according to claim 1, wherein the user equipment assistance information is sent to the first network in response to an actively initiated service establishment process by the wireless communications apparatus to the second network.

8. The wireless communications apparatus according to claim 1, wherein after sending the user equipment assistance information to the first network, the at least one processor is further configured to execute the at least one program to:

start a timer in the wireless communications apparatus, wherein a timing duration of the timer is a minimum interval duration to send the user equipment assistance information.

9. The wireless communications apparatus according to claim 1, wherein the second SIM is attached to the second network and camps on a second cell in the second network.

10. A method performed by a wireless communications apparatus, comprising:

sending user equipment assistance information to a first network requesting to release a first wireless connection between the wireless communications apparatus and the first network using a first subscriber identity module (SIM) of the wireless communications apparatus, wherein the first SIM is in a connected state in the first network, the user equipment assistance information comprises second state indication information, and the second state indication information indicates an inactive state, a light connection state, or an idle state that the first SIM is to enter;

receiving a radio resource control (RRC) connection release from the first network; and sending a connection establishment request message to a second network requesting to establish a second wireless connection between the wireless communications apparatus and the second network using a second SIM of the wireless communications apparatus.

11. The method according to claim 10, wherein, the RRC connection release comprises first state indication information, and the first state indication information indicates the inactive state, the light connection state, or the idle state to which the first SIM is to enter; and after receiving the RRC connection release from the first network, the method further comprises:

switching the first SIM to a state indicated by the first state indication information.

12. The method according to claim 10, wherein after sending the user equipment assistance information to the first network, the method further comprises:

starting a timer in the wireless communications apparatus, wherein a timing duration of the timer is a minimum interval duration to send the user equipment assistance information.

13. The method according to claim 10, wherein the user equipment assistance information comprises RRC connection release request indication information, and the RRC connection release request indication information requests to release the first wireless connection between the wireless communications apparatus and the first network for the first SIM.

14. The method according to claim 10, wherein before sending the user equipment assistance information, the first SIM is attached to the first network and the first wireless communications apparatus maintains the first wireless connection with a first cell in the first network.

15. The method according to claim 10, wherein the user equipment assistance information is sent to the first network in response to an actively initiated service establishment process by the wireless communications apparatus to the second network.

16. The method according to claim 10, wherein the second SIM is attached to the second network and camps on a second cell in the second network.

17. The method according to claim 10, wherein
after receiving the RRC connection release from the first network, switching the first SIM to a preset state in the network first, wherein the preset state is the inactive state, the light connection state, or the idle state.

18. The method according to claim 10, wherein the user equipment assistance information comprises a state switching request cause; and
wherein the state switching request cause comprises information indicating that the second SIM performs any one of following services in the second network: an emergency call, high priority access, mobile terminate-access, mobile originating signaling, mobile originating data communication, delay tolerant access, or a mobile originating voice call; or
wherein the state switching request cause comprises information indicating that an uplink radio frequency of the wireless communications apparatus is occupied.

19. A wireless communications apparatus, comprising:
a non-transitory memory storing instructions; and
at least one processor coupled to the memory to execute the instructions, wherein the instructions, when executed by the at least one processor, cause the wireless communications apparatus to:
send user equipment assistance information to a first network requesting to release a first wireless connection between the wireless communications apparatus and a first network using a first subscriber identity module (SIM) of the wireless communications apparatus, wherein the first SIM is in a connected state in the first network, the user equipment assistance information comprises second state indication information, and the second state indication information indicates an inactive state, a light connection state, or an idle state that the first SIM is to enter;
receive a radio resource control (RRC) connection release from the first network; and
send a second request message to a second network requesting to establish a second wireless connection between wireless communications apparatus and the second network using the second SIM of the wireless communications apparatus.

20. The wireless communications apparatus according to claim 19, wherein before the sending user equipment assistance information, the first SIM is attached to the first network and the first wireless communications apparatus maintains the first wireless connection with a first cell in the first network.

* * * * *

UNITED STATES PATENT AND TRADEMARK OFFICE
CERTIFICATE OF CORRECTION

| | |
|---|---|
| PATENT NO. | : 12,133,281 B2 |
| APPLICATION NO. | : 16/989189 |
| DATED | : October 29, 2024 |
| INVENTOR(S) | : Sun et al. |

Page 1 of 1

It is certified that error appears in the above-identified patent and that said Letters Patent is hereby corrected as shown below:

In the Specification

In Column 1, Line 11, delete "20181043194.9," and insert -- 201810143194.9, --.

In Column 14, Line 49, delete "alight" and insert -- a light --.

In Column 14, Line 53, delete "rreConnectionPreference-r15" and insert
-- rrcConnectionPreference-r15 --.

In the Claims

In Column 24, in Claim 1, Line 67, delete "network network" and insert -- network --.

In Column 28, in Claim 19, Line 17, after "using" delete "the" and insert -- a --.

Signed and Sealed this
Seventeenth Day of December, 2024

Derrick Brent
*Acting Director of the United States Patent and Trademark Office*